(12) United States Patent
Cariello et al.

(10) Patent No.: US 12,386,543 B2
(45) Date of Patent: Aug. 12, 2025

(54) OPPORTUNISTIC STORAGE OF NON-WRITE-BOOSTED DATA IN WRITE BOOSTER CACHE MEMORY

(71) Applicant: Micron Technology, Inc., Boise, ID (US)

(72) Inventors: Giuseppe Cariello, Boise, ID (US); Jonathan S. Parry, Boise, ID (US); Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 56 days.

(21) Appl. No.: 18/505,661

(22) Filed: Nov. 9, 2023

(65) Prior Publication Data
US 2024/0201888 A1    Jun. 20, 2024

Related U.S. Application Data

(60) Provisional application No. 63/387,536, filed on Dec. 15, 2022.

(51) Int. Cl.
*G06F 12/00* (2006.01)
*G06F 3/06* (2006.01)

(52) U.S. Cl.
CPC ............ *G06F 3/065* (2013.01); *G06F 3/0608* (2013.01); *G06F 3/064* (2013.01); *G06F 3/0679* (2013.01)

(58) Field of Classification Search
CPC ...... G06F 3/0608; G06F 3/064; G06F 3/0613; G06F 3/0659; G06F 3/065; G06F 3/0679; G06F 12/02; G06F 12/084; G06F 12/0246; G06F 2212/1032; G06F 2212/2022; G06F 2212/601; G06F 2212/7204; G06F 2212/7205; G06F 2212/7206; G06F 2212/7211
See application file for complete search history.

(56) References Cited

U.S. PATENT DOCUMENTS

2014/0337566 A1* 11/2014 Oh .................. G06F 3/0659
                                                          711/103
2021/0365202 A1* 11/2021 Shin .................. G06F 3/0679

* cited by examiner

*Primary Examiner* — Shawn X Gu
(74) *Attorney, Agent, or Firm* — Harrity & Harrity, LLP

(57) ABSTRACT

In some implementations, a memory device may receive a write command that includes data to be written to the memory device. The memory device may receive an indication that single-level cell data caching is deactivated for the data. The memory device may determine whether the data is associated with a first data type or a second data type. The memory device may selectively write the data to single-level cell cache memory or multi-level cell main memory based on a determination of whether the data is associated with the first data type or the second data type and a determination of whether the single-level cell cache memory has available memory that is not reserved for the single-level cell data caching.

20 Claims, 9 Drawing Sheets

OPPORTUNISTIC STORAGE OF NON-WRITE-BOOSTED DATA IN WRITE BOOSTER CACHE MEMORY

CROSS-REFERENCE TO RELATED APPLICATION

This Patent application claims priority to U.S. Provisional Patent Application No. 63/387,536, filed on Dec. 15, 2022, and entitled "OPPORTUNISTIC STORAGE OF NON-WRITE-BOOSTED DATA IN WRITE BOOSTER CACHE MEMORY." The disclosure of the prior Application is considered part of and is incorporated by reference into this Patent Application.

TECHNICAL FIELD

The present disclosure generally relates to memory devices, memory device operations, and, for example, to opportunistic storage of non-write-boosted data in write booster cache memory.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
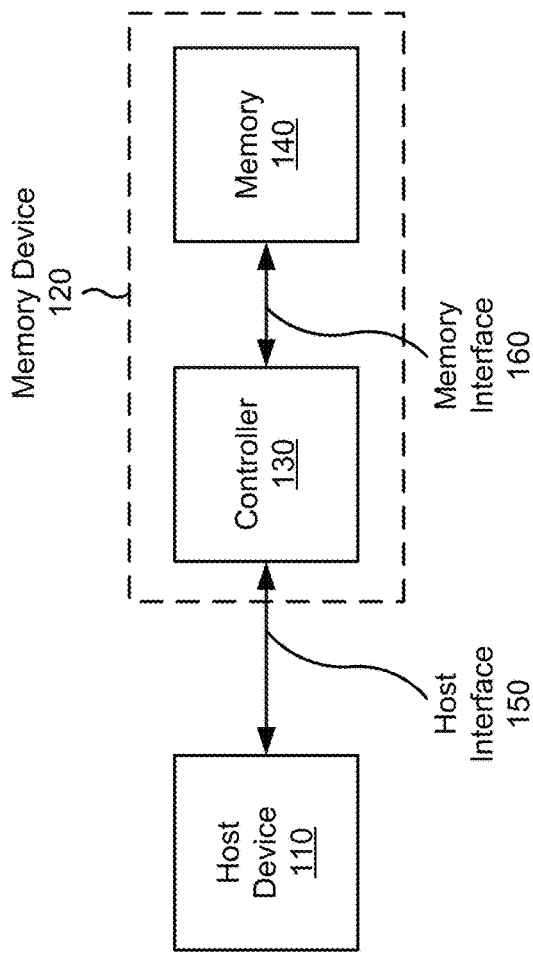
FIG. 1 is a diagram illustrating an example system capable of opportunistic storage of non-write-boosted data in write booster cache memory.

Some memory devices may use a technique called "write boosting" (sometimes called "single-level cell data caching" or "write boost data caching" herein) to increase a speed at which data is written to memory. Using write boosting, a memory device may write data to a single-level cell (SLC) non-volatile "write booster" cache memory rather than writing the data to a multi-level cell (e.g., dual-level cell, triple-level cell, quad-level cell or beyond) non-volatile main memory. Because data can be written to SLC cache memory faster than the data can be written to multi-level cell (MLC) main memory, using write boosting increases write speeds. A specific write boosting technique is defined by the Joint Electron Device Engineering Council (JEDEC) universal flash storage (UFS) standard JESD220.

To use write boosting, a host device explicitly instructs the memory device to activate write boosting, such as by transmitting a message to the memory device (e.g., in a write command or prior to transmitting the write command) that instructs the memory device to activate write boosting for one or more write commands. For example, the host device may activate write boosting for a large file that is downloaded by the host device and stored in the memory device. If the host device does not instruct the memory device to activate write boosting, then the memory device does not use write boosting.

However, requiring explicit activation for the memory device to write data to write booster cache memory (e.g., SLC cache memory used for write boosting) may result in inefficient utilization of memory resources and poor flexibility for memory block management. For example, if the host device never activates write boosting or activates write boosting infrequently, then write booster cache memory may rarely or never be used. On the other hand, if the memory device is permitted to unconditionally write data to the write booster cache memory, then the write booster cache memory may be unavailable for write boosting requests from the host device and/or the write booster cache memory may wear out earlier.

Some implementations described herein enable the memory device to opportunistically (e.g., conditionally) write non-write-boosted data to write booster cache memory, which increases write speeds and results in better memory resource utilization. In some implementations, the memory device may reserve a portion of the write booster cache memory for storage of data for which write boosting is activated, which increases the likelihood that some write booster cache memory is available when write boosting is requested by the host device.

Furthermore, some implementations described herein limit the type of data permitted to be stored in the write booster cache memory. As an example, the memory device may store hot data, having a relatively short expected lifespan (e.g., as compared to cold data) and/or that is more frequently accessed, erased, and/or overwritten (e.g., as compared to cold data), in the write booster cache memory. This may extend the lifespan of the memory device because otherwise the hot data would be written to MLC main memory and would be marked as invalid soon after (e.g., due to being hot data with a relatively short lifespan), requiring subsequent erasure and wearing out the MLC main memory more quickly due to shorter program/erase (P/E)

cycles. In general, MLC memory has a shorter lifespan (e.g., becoming unreliable in fewer P/E cycles) than SLC memory. As a result, writing hot data to SLC memory rather than MLC memory has a less detrimental impact on the lifespan of the memory device compared to writing the hot data to the MLC memory.

Thus, some implementations described herein extend the lifespan of the memory device (e.g., by reducing write amplification of hot data in MLC memory), improve resource utilization of the memory device (e.g., by permitting flexible use of SLC memory that would otherwise be entirely used for write boosting), and/or improve performance of the memory device (e.g., by ensuring that a portion of write booster memory cache is available for write-boosting operations).

FIG. 1 is a diagram illustrating an example system 100 capable of opportunistic storage of non-write-boosted data in write booster cache memory. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IOT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to receive, from a host device, an indication of a threshold amount of non-volatile cache memory to be reserved for first data for which write boosting is activated; receive, from the host device, a write command that includes second data for which write boosting is deactivated; determine that the second data is hot data; identify a block of the non-volatile cache memory using a write boost cursor based on determining that the second data is hot data, based on the indication of the threshold amount, and despite write boosting being deactivated for the second data; and write the second data to the block of the non-volatile cache memory.

In some implementations, the memory device 120 and/or the controller 130 may be configured to receive a write command that includes data to be written to the memory device; receive an indication that single-level cell data caching is deactivated for the data; determine whether the data is associated with a first data type or a second data type;

and selectively write the data to single-level cell cache memory or multi-level cell main memory based on: a determination of whether the data is associated with the first data type or the second data type, and a determination of whether the single-level cell cache memory has available memory that is not reserved for the single-level cell data caching.

In some implementations, the memory device 120 and/or the controller 130 may be configured to receive a write command that includes data to be written to the memory device; determine that write boost data caching is deactivated for the data; determine that the data is associated with a first data type; determine that the data is to be written to cache memory, rather than main memory, based on determining that the data is associated with the first data type and despite write boost data caching being deactivated for the data; and write the data to the cache memory based on determining that the data is to be written to the cache memory.

In some implementations, the memory device 120 and/or the controller 130 may be configured to process a received command to write data to a non-volatile memory array, wherein the command is received without an indication that the data is to be written in a single-level cell (SLC) cache memory of the non-volatile memory array; determine whether the data is associated with a first data type; determine whether the SLC cache memory has sufficient memory not reserved for SLC data caching; and write the data to the SLC cache memory based on a determination that the data is associated with the first data type and that the SLC cache memory has sufficient memory not reserved for SLC data caching.

As indicated above, FIG. 1 is provided as an example. Other examples may differ from what is described with regard to FIG. 1.

Figure 2:
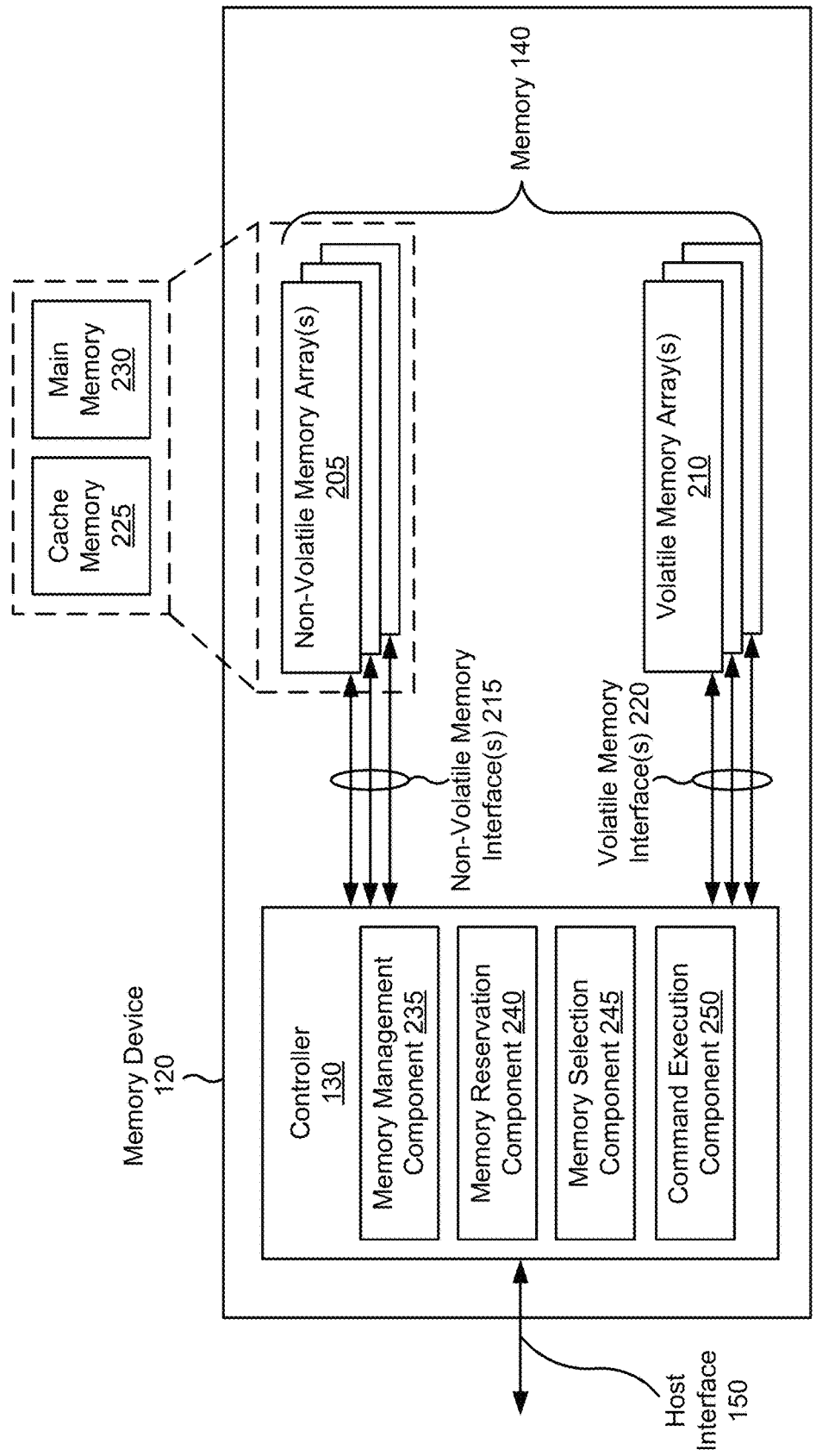
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220. In some implementations, a single non-volatile memory array 205 is included in a single corresponding die along with a local controller. Multiple dies, each including a non-volatile memory array 205 and a local controller, may be stacked and/or incorporated into an integrated circuit along with an external (or global) controller that communicates with respective local controllers of each die.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the memory 140 (e.g., the non-volatile memory arrays 205) may include cache memory 225 (sometimes called non-volatile cache memory) and main memory 230 (sometimes called non-volatile main memory). The cache memory 225 and the main memory 230 may both be non-volatile memory. The cache memory 225 may store fewer bits per memory cell than the main memory 230, and the main memory 230 may store more bits per memory cell than the cache memory 225. For example, the cache memory 225 may include SLC memory cells that store one bit per cell, while the main memory 230 may include MLC memory cells that store more than one bit per cell, such as dual-level cell (DLC) memory cells that store two bits per cell, triple-level cell (TLC) memory cells that store three bits per cell, quad-level cell (QLC) memory cells that store four bits per cell, and/or penta-level cell (PLC) memory cells that store five bits per cell. Thus, the cache memory 225 may be referred to as SLC cache memory and the main memory 230 may be referred to as MLC main memory. In some implementations, the cache memory 225 (or a portion of the cache memory 225) is used for write boosting. For example, the cache memory 225 (or a portion of the cache memory 225) may be configured to store data for which write boosting is activated.

As further shown in FIG. 2, the controller 130 may include a memory management component 235, a memory reservation component 240, a memory selection component 245, and/or a command execution component 250. In some implementations, one or more of these components are implemented as one or more instructions (e.g., firmware) executed by the controller 130. Alternatively, one or more of these components may be implemented as dedicated integrated circuits distinct from the controller 130.

The memory management component 235 may be configured to manage performance of the memory device 120. For example, the memory management component 235 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 235, such as information regarding memory block age, memory block erase count, and/or error information associated with a memory partition (e.g., a memory cell, a row of memory, a block of memory, or the like).

The memory reservation component 240 may be configured to reserve a portion of the cache memory 225 for data for which write boosting is activated (sometimes called "write-boosted data"). For example, the memory reservation component 240 may receive, from the host device 110, an indication of an amount of cache memory 225 to be reserved for write-boosted data and may reserve that amount of the cache memory 225 for the write-boosted data.

The memory selection component 245 may determine and/or select a portion of the memory 140 to which data is to be written. In some implementations, the memory selection component 245 may determine whether to write data to the cache memory 225 or the main memory 230 based on a data type of the data (e.g., hot data, cold data, or small fragment data). Additionally, or alternatively, the memory selection component 245 may determine whether to write data to the cache memory 225 or the main memory 230 based on whether the cache memory 225 has available memory that is not reserved for write-boosted data (e.g., whether writing data to the cache memory 225 would cause the available memory of the cache memory 225 to fall below the amount of cache memory 225 reserved for write-boosted data). Additionally, or alternatively, the memory selection component 245 may determine whether to write data to the cache memory 225 or the main memory 230 based on whether write boosting is activated for the data. In some implementations, the memory selection component 245 may determine to write data to the cache memory 225 despite write boosting being deactivated for the data (e.g., based on the data type and/or the available memory of the cache memory 225).

The command execution component 250 may be configured to execute one or more memory commands, such as a read command, a write command (sometimes called a program command), or an erase command. For example, the command execution component 250 may receive and/or execute a write command to write data to the memory 140. In some implementations, the command execution component 250 may receive an indication from the memory selection component 245 that indicates whether to write the data to the cache memory 225 or the main memory 230, and the command execution component 250 may write the data to the cache memory 225 or the main memory 230 based on the indication. Additionally, or alternatively, the command execution component 250 may be configured to perform a garbage collection operation, such as by copying data from an old block (e.g., of cache memory 225) to one or more new blocks (e.g., of cache memory 225 and/or main memory 230).

One or more devices or components shown in FIG. 2 may be configured to perform operations described elsewhere herein, such as one or more operations and/or methods described in connection with FIGS. 3-9. For example, the controller 130, the memory management component 235, the memory reservation component 240, the memory selection component 245, and/or the command execution component 250 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
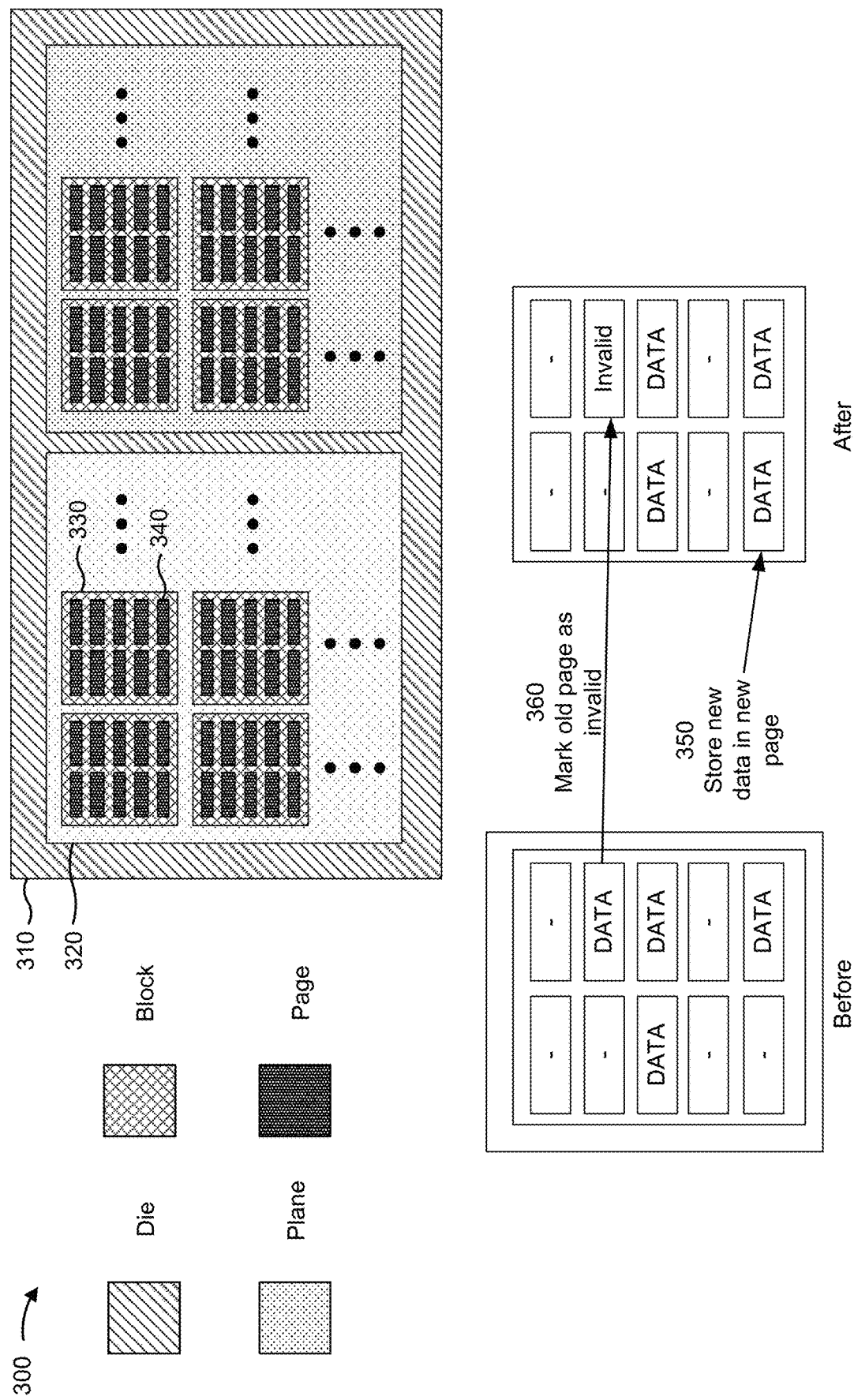
FIG. 3 is a diagram illustrating an example memory architecture that may be used by the memory device.

FIG. 3 is a diagram illustrating an example memory architecture 300 that may be used by the memory device 120. The memory device 120 may use the memory architecture 300 to store data. As shown, the memory architecture 300 may include a die 310, which may include multiple planes 320. A plane 320 may include multiple blocks 330. A block 330 may include multiple pages 340. Although FIG. 3 shows a particular quantity of planes 320 per die 310, a particular quantity of blocks 330 per plane 320, and a particular quantity of pages 340 per block 330, these quantities may be different than what is shown. In some implementations, the memory architecture 300 is a NAND memory architecture.

The die 310 is a structure made of semiconductor material, such as silicon. In some implementations, a die 310 is the smallest unit of memory that can independently execute commands. A memory device 120 may include one or more dies 310. In some implementations, the memory device 120 may include multiple dies 310. In this case, multiples dies 310 may each perform a respective memory operation (e.g., a read operation, a write operation, or an erase operation) in parallel. For example, a controller 130 of the memory device 120 may be configured to concurrently perform memory operations on multiple dies 310 for parallel control. In some implementations, a die 310 may include a memory array (e.g., a non-volatile memory array) and a local controller. Multiple dies 310 may be stacked and/or otherwise incorporated into a memory device 120 along with an external (or global) controller that communicates with respective local controllers of each die 310.

Each die 310 of a memory device 120 includes one or more planes 320. A plane 320 is sometimes called a memory plane. In some implementations, identical and concurrent operations can be performed on multiple planes 320 (sometimes with restrictions). For example, a multi-plane command (e.g., a multi-plane read command or a multi-plane write command) may be executed on multiple planes 320 concurrently, whereas a single plane command (e.g., a single plane read command or a single plane write command) may be executed on a single plane 320. A logical unit of the memory device 120 may include one or more planes 320 of a die 310. In some implementations, a logical unit may include all planes 320 of a die 310 and may be equivalent to a die 310. Alternatively, a logical unit may include fewer than all planes 320 of a die 310. A logical unit may be identified by a logical unit number (LUN). Depending on the context, the term "LUN" may refer to a logical unit or an identifier (e.g., a number) of that logical unit.

Each plane 320 includes multiple blocks 330. A block 330 is sometimes called a memory block. Each block 330 includes multiple pages 340. A page 340 is sometimes called a memory page. A block 330 is the smallest unit of memory that can be erased. In other words, an individual page 340 of a block 330 cannot be erased without erasing every other page 340 of the block 330. A page 340 is the smallest unit of memory to which data can be written (i.e., the smallest unit of memory that can be programmed with data). The terminology "programming" memory and "writing to" memory may be used interchangeably. A page 340 may include multiple memory cells that are accessible via the same access line (sometimes called a word line). A "page line" refers to a group of pages 340 at a same position across multiple planes 320 in a group of planes 320 (e.g., a first page having page index 0 in a first plane, a second page having page index 0 in a second plane, a third page having page index 0 in a third plane, and so on). In some implementations, a block 330 may be divided into multiple sub-blocks. A sub-block is a portion of a block 330 and may include a subset of pages 340 of the block and/or a subset of memory cells of the block 330.

In some implementations, read and write operations are performed for a specific page 340, while erase operations are performed for a block 330 (e.g., all pages 340 in the block 330). In some implementations, to prevent wearing out of memory, all pages 340 of a block 330 may be programmed before the block 330 is erased to enable a new program operation to be performed to a page 340 of the block 330. After a page 340 is programmed with data (called "old data" below), that data can be erased, but that data cannot be overwritten with new data prior to being erased. The erase operation would erase all pages 340 in the block 330, and erasing the entire block 330 every time that new data is to replace old data would quickly wear out the memory cells of the block 330. Thus, rather than performing an erase operation, the new data may be stored in a new page (e.g., an empty page), as shown by reference number 350, and the old page that stores the old data may be marked as invalid, as shown by reference number 360. The memory device 120 may then point operations associated with the data to the new page (e.g., in an address table) and may track invalid pages to prevent program operations from being performed on invalid pages prior to an erase operation.

When a block 330 satisfies an erasure condition, the memory device 120 may select the block 330 for erasure, copy the valid data of the block 330 (e.g., to a new block 330 or to the same block 330 after erasure), and erase the block 330. For example, the erasure condition may be that all pages 340 of the block 330 or a threshold quantity or percentage of pages 340 of the block 330 are unavailable for further programming (e.g., are either invalid or already store valid data). As another example, the erasure condition may be that a quantity or percentage of free pages 340 of the block 330 (e.g., pages 340 that are available to be written) is less than or equal to a threshold. The process of selecting a block 330 satisfying an erasure condition, copying valid pages 340 of that block 330 to a new block 330 (or the same block 330 after erasure), and erasing the block 330 is sometimes called garbage collection and is used to free up memory space of the memory device 120.

As indicated above, FIG. 3 is provided as an example. Other examples may differ from what is described with regard to FIG. 3.

Figure 4:
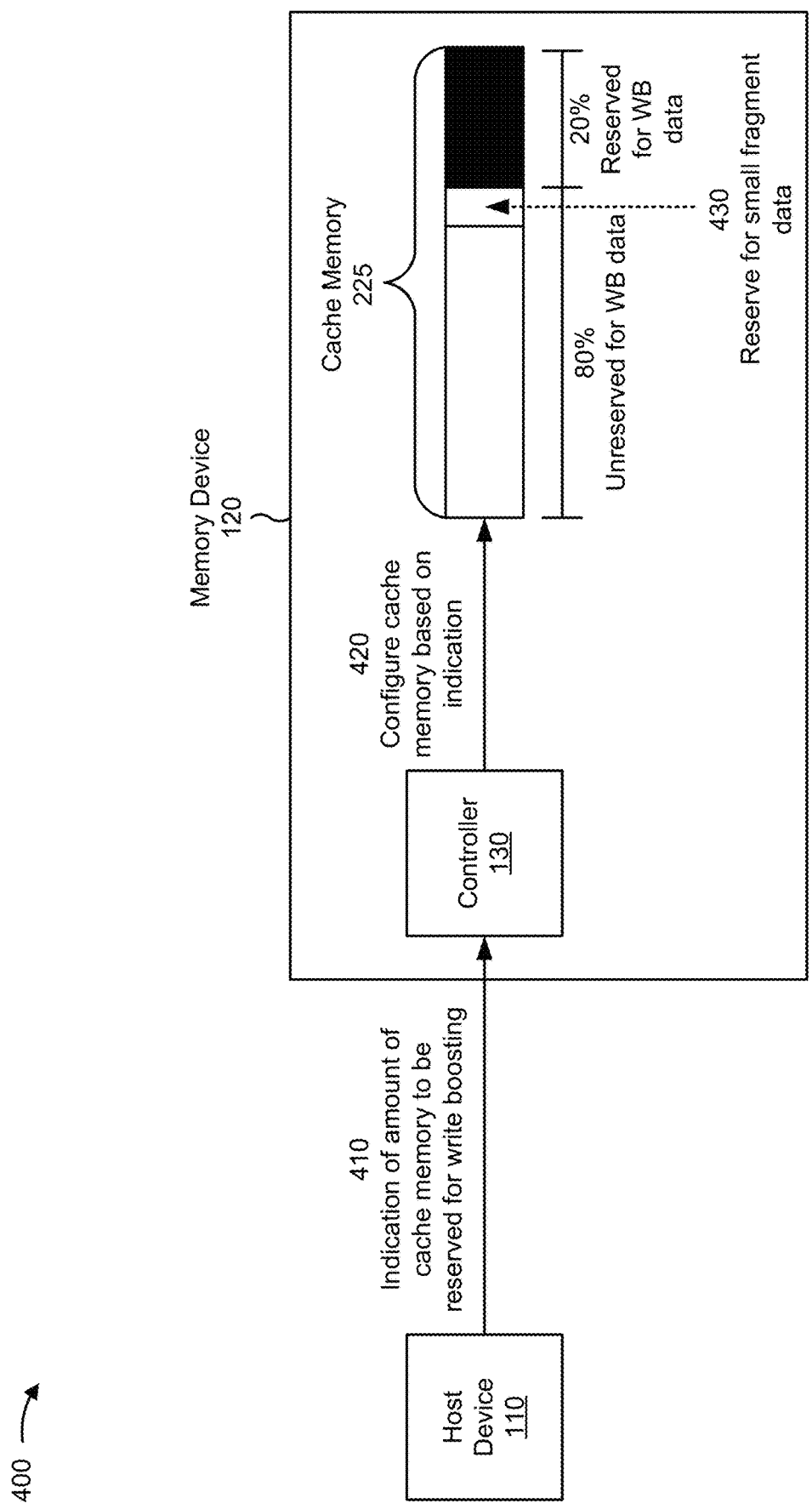
FIG. 4 is a diagram of an example of reserving a portion of write booster cache memory for write-boosted data.

FIG. 4 is a diagram of an example 400 of reserving a portion of write booster cache memory for write-boosted data. The operations described in connection with FIG. 4 may be performed by the memory device 120 and/or one or more components of the memory device 120, such as the controller 130 and/or one or more components of the controller 130.

As shown by reference number 410, the memory device 120 (e.g., the controller 130) may receive an indication of an amount of cache memory 225 (e.g., non-volatile cache memory) to be reserved for write boosting. In other words, the memory device 120 may receive an indication of an amount of cache memory 225 to be reserved for data (e.g., write-boosted data) for which write boosting is activated. As shown, in some implementations, the memory device 120 may receive the indication from the host device 110. The amount of cache memory 225 to be reserved may be referred to as a threshold amount or a reserved amount. "Write boosting" is sometimes called "SLC data caching" or "write boost data caching" herein.

In some implementations, the host device 110 may determine the amount of cache memory 225 to be reserved for write boosting based on one or more characteristics of the host device 110, such as a device type of the host device 110 (e.g., a server, a personal computer, a smartphone, or an automotive device), a frequency with which the host device 110 is expected to request write boosting, and/or a rate at which the host device 110 is expected to transmit write commands to the memory device 120. In some implementations, the threshold amount may be indicated as a threshold size of a portion of the cache memory 225 to be reserved, such as a quantity of bytes (e.g., 100 megabytes, 1 gigabyte, 5 gigabytes, or the like). Alternatively, the threshold amount may be indicated as a threshold percentage of the cache memory 225 to be reserved, such as ten percent, twenty percent, thirty percent, or the like. In some implementations, the host device 110 may indicate the amount of cache memory 225 to be reserved by indicating the amount of cache memory 225 to be made available for non-write-boosted data, with the remaining amount of cache memory 225 to be reserved for write-boosted data.

Additionally, or alternatively, the host device 110 may indicate one or more characteristics (as described above) of the host device 110 to the memory device 120, and the memory device 120 may determine the amount of cache memory 225 to be reserved for write boosting based on the one or more characteristics. For example, the memory device 120 may reserve a larger quantity or percentage of the cache memory 225 for a host device 110 that is expected to request write boosting more frequently, and the memory device 120 may reserve a smaller quantity or percentage of the cache memory 225 for a host device 110 that is expected to request write boosting less frequently.

As shown by reference number 420, the memory device 120 (e.g., the controller 130) may configure the cache memory 225 based on the indication, such as by reserving the threshold amount of cache memory 225 for write boosting. For example, the memory device 120 may store an indication, in the memory 140, of the reserved amount of cache memory 225 reserved for write-boosted data. Additionally, or alternatively, the memory device 120 may store an indication, in the memory 140, of an unreserved amount of cache memory 225 that is not reserved for write-boosted data. In the example 400 of FIG. 4, the memory device 120 reserves twenty percent of the cache memory 225 for write-boosted data (shown as "WB data"), and the remaining eighty percent of the cache memory 225 is unreserved and available for non-write-boosted data.

As used herein, "write-boosted data" refers to first data for which write boosting is activated, and "non-write-boosted data" refers to second data for which write boosting is deactivated. Write boosting may be activated or deactivated for data by the host device 110. For example, the host device 110 may activate write boosting for first data by transmitting an activation instruction to the memory device 120 (e.g., in a write command or prior to transmitting the write command) that instructs the memory device 120 to activate write boosting for a write command that includes the first data. In this case, any write command not indicated by the activation instruction is associated with second data for which write boosting is deactivated. As another example, the host device 110 may transmit an activation instruction to activate write boosting, may transmit one or more write commands for which write boosting is activated, and may then transmit a deactivation instruction to deactivate write boosting (e.g., for any subsequent write commands until another activation instruction is transmitted).

As shown by reference number 430, in some implementations, the memory device 120 (e.g., the controller 130) may reserve a portion of the cache memory 225 for small fragment data. For example, and as shown, the memory device 120 may reserve a portion of the unreserved cache memory 225, that is not reserved for write-boosted data, for small fragment data. Small fragment data is a type of data having a size (e.g., in bytes) that is less than a threshold size. For example, small fragment data may have a size that is less than a page line size of a page line of the memory device 120 (e.g., a page line of the main memory 230). A page line may include a group of pages (e.g., of the main memory 230) located at a same position and/or identified by a same index value across multiple planes and/or multiple dies of the memory device 120. For example, if a page size (e.g., an amount of data stored in an individual page) is 16 kilobytes and there are 16 pages in a page line, then the page line size is 256 kilobytes. In this case, small fragment data may be data, to be written to the memory device 120, having a size less than 256 kilobytes.

In some cases, the memory device 120 may be configured to write data to the main memory 230 such that an entire page line is filled with each write operation. If the memory device 120 receives a write command indicating small fragment data (e.g., less than 256 kilobytes) to be written to the memory device 120, then the memory device 120 may need to write non-host data (e.g., dummy data) to the remaining pages of the page line that are not occupied by the small fragment data. This wastes memory resources of the main memory 230. To improve memory utilization, the memory device 120 may store the small fragment data in the cache memory 225 until a condition is satisfied (e.g., enough small fragment data has accumulated in the cache memory 225 to fill an entire page line or a threshold portion of a page line).

By reserving a first portion of the cache memory 225 for write-boosted data while enabling use of a second portion of the cache memory 225 for non-write-boosted data (particularly hot data, as described in more detail below), the memory device 120 may extend the lifespan of the memory device 120 (e.g., by reducing write amplification of hot data in the main memory 230), may improve resource utilization of the memory device 120 (e.g., by permitting flexible use of the cache memory 225 that would otherwise be entirely used for write boosting), and/or may improve performance of the memory device 120 (e.g., by ensuring that a portion of the cache memory 225 is available for write-boosting operations). Furthermore, by reserving a portion of the cache memory 225 for small fragment data, the memory device 120 may ensure that the small fragment data operations described above can be performed, thereby improving memory resource utilization of the main memory 230.

As indicated above, FIG. 4 is provided as an example. Other examples may differ from what is described with regard to FIG. 4.

Figure 5:
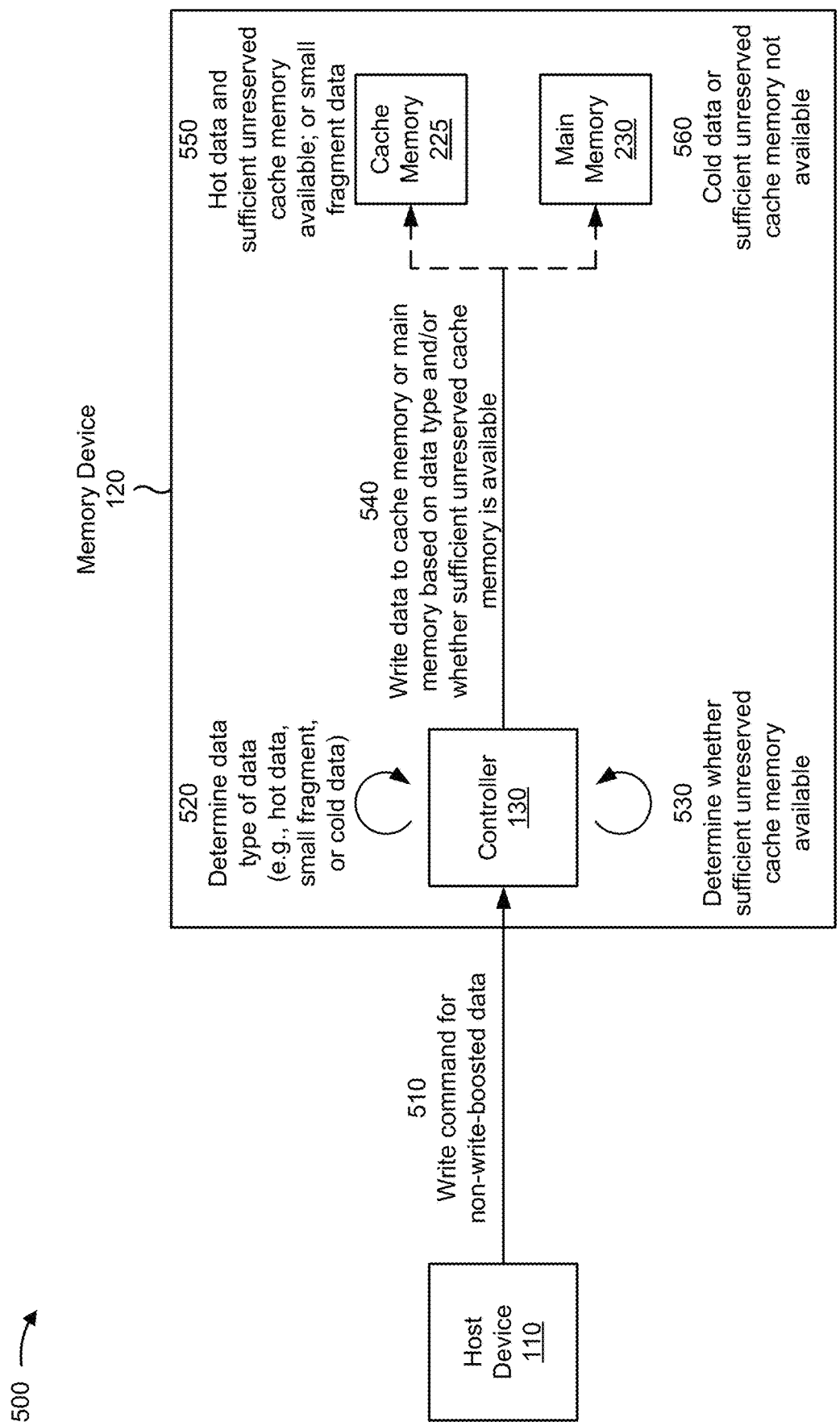
FIG. 5 is a diagram of an example of opportunistic storage of non-write-boosted data in write booster cache memory.

FIG. 5 is a diagram of an example 500 of opportunistic storage of non-write-boosted data in write booster cache memory. The operations described in connection with FIG. 5 may be performed by the memory device 120 and/or one or more components of the memory device 120, such as the controller 130 and/or one or more components of the controller 130.

As shown by reference number 510, the memory device 120 (e.g., the controller 130) may receive a write command for non-write-boosted data (e.g., data for which write boosting is deactivated). As shown, in some implementations, the memory device 120 may receive the write command from the host device 110. In some implementations, the write command includes the data and an indication that write boosting is deactivated for the data. In some implementations, the write command does not include an indication that write boosting is deactivated for the data. Rather, the host device 110 may transmit a separate instruction that indicates whether write boosting is activated for a write command. In some implementations, write boosting may be deactivated by default, and the memory device 120 may determine that write boosting is deactivated for a write command unless the memory device 120 receives an indication that write boosting is activated for the write command.

As shown by reference number 520, the memory device 120 (e.g., the controller 130) may determine a data type of the non-write-boosted data. The data type may be a first data type, such as hot data, or a second data type, such as cold data. As used herein, "hot data" may include data with a relatively short expected lifespan (e.g., before being overwritten or marked as invalid, as described above in connection with FIG. 3), and "cold data" may include data with a relatively long expected lifespan. For example, hot data may have an expected lifespan that is shorter than an expected lifespan associated with cold data. In other words, hot data is expected to become invalid and/or is expected to be overwritten in a shorter amount of time than cold data. In some implementations, hot data has an expected lifespan that is less than (or equal to) a threshold, and cold data has an expected lifespan that is greater than (or equal to) the threshold.

Additionally, or alternatively, "hot data" may include data that is accessed, erased, and/or overwritten more frequently (e.g., than cold data) or relatively frequently (e.g., compared to cold data), and "cold data" may include data that is accessed, erased, and/or overwritten less frequently (e.g., than hot data) or relatively infrequently (e.g., compared to hot data). For example, because hot data is erased more frequently than cold data, hot data may have a shorter lifespan (e.g., in a particular memory location) than cold data because the hot data stored in a particular memory location may be erased or marked as invalid, and new data that replaces the hot data stored in the particular memory location may be written to a new memory location. In some implementations, hot data is accessed, erased, and/or overwritten with a frequency (e.g., a quantity of instances in a time period) that is greater than (or equal to) a threshold, and cold data is accessed, erased, and/or overwritten with a frequency that is less than (or equal to) a threshold.

In some implementations, the memory device 120 may receive an indication of whether non-write-boosted data included in the write command (or associated with the write command) is hot data or cold data. For example, the host device 110 may indicate (e.g., in the write command or in a separate message) whether the non-write-boosted data included in the write command is hot data or cold data. Additionally, or alternatively, the memory device 120 may determine whether the non-write-boosted data included in the write command is hot data or cold data based on one or more characteristics of the non-write-boosted data (e.g., a size of the non-write-boosted data), one or more characteristics of the write command (e.g., other information included in the write command and/or a rate at which write commands are received from the host device 110), and/or one or more characteristics associated with the host device 110 (as described elsewhere herein).

In some implementations, the memory device 120 may use historical information to determine whether the non-write-boosted data in a write command is hot data or cold data. For example, the memory device 120 may store information about historical data written by the memory device 120 based on historical write commands received from the host device 110. The memory device 120 may store, for example, an indication of an actual lifespan of historical data previously written to the memory device 120 (e.g., a time between writing the data and overwriting or marking the data as invalid) along with one or more historical characteristics of the data, one or more historical characteristics of the write command in which the data was received, and/or one or more historical characteristics of the host device 110. The memory device 120 may compare one or more characteristics associated with a new write command (that includes non-write-boosted data) and one or more historical characteristics (and corresponding actual lifespans) to determine whether the non-write-boosted data is hot data or cold data.

Additionally, or alternatively, the data type may be small fragment data, as described above in connection with FIG. 4. In some implementations, the memory device 120 may determine whether the non-write-boosted data is small fragment data based on comparing the size of the non-write-boosted data to a threshold size, such as a page line size. If the size of the non-write-boosted data is less than (or equal to) the threshold size, then the non-write-boosted data is small fragment data. If the size of the non-write-boosted data is greater than (or equal to) the threshold size, then the non-write-boosted data is not small fragment data. Although data cannot be both hot data and cold data, in some implementations, data may be both hot data and small fragment data (e.g., small fragment data with a relatively short expected lifespan) or may be both cold data and small fragment data (e.g., small fragment data with a relatively long expected lifespan).

As shown by reference number 530, the memory device 120 may determine whether there is sufficient unreserved cache memory 225 available for storage of the non-write-boosted data. As described above in connection with FIG. 4, the memory device 120 may reserve a threshold amount of the cache memory 225 for write-boosted data. If the memory device 120 determines that writing the non-write-boosted data to the cache memory 225 would cause the available memory of the cache memory 225 to fall below the threshold amount, then the memory device 120 may refrain from writing the non-write-boosted data to the cache memory 225. In this case, the memory device 120 may write the non-write-boosted data to the main memory 230. Additionally, or alternatively, if the memory device 120 determines that writing the non-write-boosted data to the cache memory 225 would leave a remaining amount of available memory of the cache memory 225, that satisfies a threshold (e.g., that is greater than or equal to the threshold amount), then the memory device 120 may write the non-write-boosted data to the cache memory 225 (e.g., if the non-write-boosted data is hot data and/or small fragment data, as described elsewhere herein).

As another example, the memory device 120 may determine a threshold amount of unreserved cache memory 225 (e.g., that is not reserved for write-boosted data). If the memory device 120 determines that writing the non-write-boosted data to the cache memory 225 would cause the amount of the cache memory 225 used for non-write-boosted data to exceed this threshold amount, then the memory device 120 may refrain from writing the non-write-boosted data to the cache memory 225 (and may write the non-write-boosted data to the main memory 230). In some implementations, the threshold amount of unreserved cache memory 225 available for non-write-boosted data is based on a threshold amount of cache memory 225 reserved for write-boosted data (e.g., a remaining amount of unreserved cache memory 225). In some implementations, the threshold amount of unreserved cache memory 225 available for non-write-boosted data is based on an amount of cache memory 225 reserved for write-boosted data and an amount of cache memory 225 reserved for small fragment data (e.g., a remaining amount of unreserved cache memory 225).

If the memory device 120 reserves a portion of the cache memory 225 for small fragment data and if the memory device 120 determines that the non-write-boosted data is small fragment data, then the memory device 120 may refrain from determining if the non-write-boosted data is hot data or cold data and may refrain from determining whether there is sufficient unreserved cache memory 225 available for non-write-boosted data. This may result in faster write times by removing unnecessary operations. However, in some implementations, the memory device 120 may determine whether there is sufficient cache memory 225 available for the small fragment data (e.g., using the cache memory 225 reserved for the small fragment data and/or the unreserved cache memory 225). If there is not, then the memory device 120 may write the small fragment data to the main memory 230.

In some implementations, the memory device 120 may determine whether there is sufficient unreserved cache memory 225 available for storage of the non-write-boosted data (as described in connection with reference number 530) before determining whether the non-write-boosted data is hot data or cold data (as described in connection with reference number 520). If there is insufficient unreserved cache memory 225 available for storage of the non-write-boosted data, then the memory device 120 may refrain from determining whether the non-write-boosted data is hot data or cold data. This may result in faster write times by removing unnecessary operations because the memory device 120 cannot write the non-write-boosted data to the cache memory 225 regardless of whether the non-write-boosted data is hot data or cold data. However, in some implementations, the memory device 120 may still determine whether the non-write-boosted data is small fragment data, as described above. Furthermore, if the memory device 120 determines that there is sufficient unreserved cache memory 225 available for storage of the non-write-boosted data, the memory device 120 may then determine whether the non-write-boosted data is hot data or cold data (as described in connection with reference number 520).

Alternatively, the memory device 120 may determine whether the non-write-boosted data is hot data or cold data before determining whether there is sufficient unreserved cache memory 225 available for storage of the non-writeboosted data. If the non-write-boosted data is cold data, then the memory device 120 may refrain from determining whether there is sufficient unreserved cache memory 225 available for storage of the non-write-boosted data. This may result in faster write times by removing unnecessary operations because the memory device 120 does not write cold non-write-boosted data to the cache memory 225. However, if the memory device 120 determines that the non-write-boosted data is hot data, the memory device 120 may then determine whether there is sufficient unreserved cache memory 225 available for storage of the hot non-write-boosted data.

As shown by reference number 540, the memory device 120 may selectively write the non-write-boosted data to the cache memory 225 or the main memory 230 based on the data type of the non-write boosted data and/or based on whether sufficient unreserved cache memory 225 is available. As used herein, "selectively" writing the non-write-boosted data to the cache memory 225 or the main memory 230 means to either write the non-write-boosted data to the cache memory 225 or to write the non-write-boosted data to the main memory 230. For example, selectively writing the non-write-boosted data to the cache memory 225 or the main memory 230 based on whether a condition is satisfied (e.g., a condition dependent on the data type and/or whether sufficient unreserved cache memory 225 is available) means that the non-write-boosted data is written to the cache memory 225 if the condition is satisfied and that the non-write-boosted data is written to the main memory 230 if the condition is not satisfied (or vice versa). Thus, selectively writing the non-write-boosted data to the cache memory 225 or the main memory 230 may include determining whether to write the non-write-boosted data to the cache memory 225 or whether to write the non-write-boosted data to the main memory 230 and then either writing the non-write-boosted data to the cache memory 225 or writing the non-write-boosted data to the main memory 230 based on that determination.

As an example, and as shown by reference number 550, if the memory device 120 determines that the non-write-boosted data is hot data (e.g., is associated with a first data type) and that the cache memory 225 has sufficient memory (e.g., that is not reserved for write-boosted data and/or that is not reserved for small fragment data) to store the hot non-write-boosted data, then the memory device 120 may write the hot non-write-boosted data to the cache memory 225 (e.g., to store the hot non-write-boosted data in the cache memory 225). Additionally, or alternatively, if the memory device 120 determines that the non-write-boosted data is small fragment data and that the cache memory 225 has sufficient memory (e.g., that is not reserved for write-boosted data and/or that is reserved for small fragment data) to store the small fragment non-write-boosted data, then the memory device 120 may write the small fragment non-write-boosted data to the cache memory 225 (e.g., to store the small fragment non-write-boosted data in the cache memory 225). The memory device 120 may write the non-write-boosted data to the cache memory 225 (e.g., the write booster cache memory) despite write boosting being deactivated for the non-write-boosted data.

In some implementations, the memory device 120 may use a write boost cursor to identify a location of the cache memory 225 to which the non-write-boosted data is to be written. A "write boost cursor" may include information stored by the memory device 120 (e.g., in non-volatile memory) that indicates the location. The location may include, for example, a die, a plane, a block, a sub-block, a page line, and/or a page. If the memory device 120 determines that the non-write-boosted data is to be stored in the cache memory 225, then the memory device 120 may use the write boost cursor (sometimes called a cache memory cursor) to determine the location to which the non-write boosted data is to be written. Otherwise, the memory device 120 may use a different write cursor (e.g., a main memory cursor) to determine a memory location to which the non-write-boosted data is to be written (e.g., in the main memory 230).

As another example, and as shown by reference number 560, if the memory device 120 determines that the non-write-boosted data is cold data (e.g., is associated with a second data type) or that the cache memory 225 does not have sufficient memory (e.g., that is not reserved for write-boosted data and/or that is not reserved for small fragment data) to store the non-write-boosted data, then the memory device 120 may write the non-write-boosted data to the main memory 230 (e.g., to store the non-write-boosted data in the main memory 230). As described above, if the memory device 120 determines that the non-write-boosted data is to be stored in the main memory 230, then the memory device 120 may use a main memory cursor to determine the location (e.g., a die, a plane, a block, a sub-block, a page line, and/or a page) in the main memory 230 to which the non-write boosted data is to be written.

By writing some non-write-boosted data (e.g., hot data and/or small fragment data) to the cache memory 225 while also reserving a portion of the cache memory 225 for write-boosted data, the memory device 120 may extend the lifespan of the memory device 120 (e.g., by reducing write amplification of hot data in the main memory 230), may improve resource utilization of the memory device 120 (e.g., by permitting flexible use of the cache memory 225 that would otherwise be entirely used for write boosting and by refraining from writing large amounts of dummy data along with small fragment data to the main memory 230), and/or may improve performance of the memory device 120 (e.g., by ensuring that a portion of the cache memory 225 is available for write-boosting operations).

As indicated above, FIG. 5 is provided as an example. Other examples may differ from what is described with regard to FIG. 5.

Figure 6:
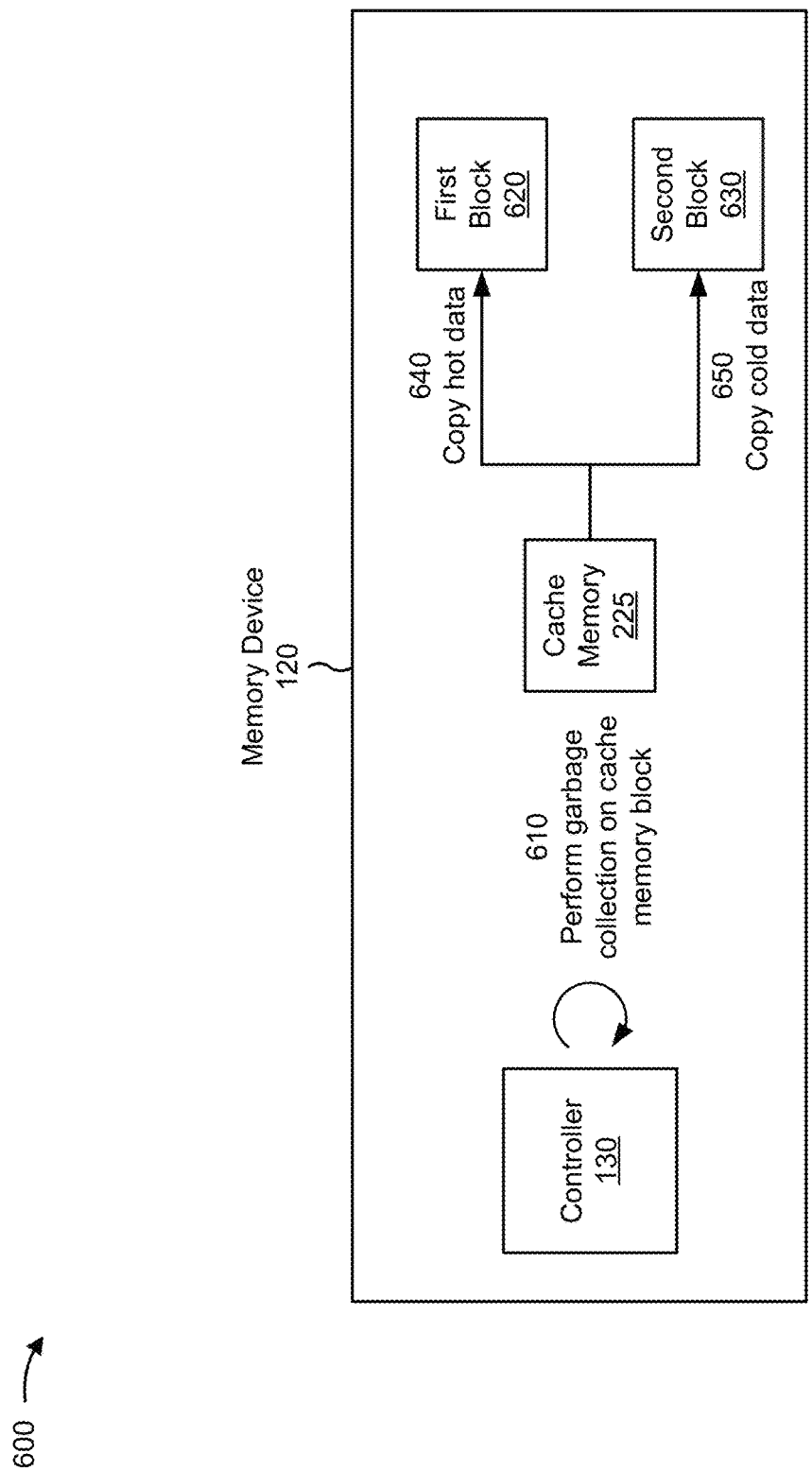
FIG. 6 is a diagram of an example of performing a garbage collection operation on write booster cache memory.

FIG. 6 is a diagram of an example 600 of performing a garbage collection operation on write booster cache memory. The operations described in connection with FIG. 6 may be performed by the memory device 120 and/or one or more components of the memory device 120, such as the controller 130 and/or one or more components of the controller 130.

As shown by reference number 610, the memory device 120 (e.g., the controller 130) may perform a garbage collection operation on the cache memory 225. As described above in connection with FIG. 3, the garbage collection operation may include, for example, identifying a block (sometimes called an old block) of cache memory 225 that satisfies an erasure condition (as described above in connection with FIG. 3), copying valid pages of the identified block to one or more new blocks, and erasing the identified block. The memory device 120 may perform the garbage collection to free up memory resources of the cache memory 225.

In some implementations, as part of performing the garbage collection operation, the memory device 120 may write data, from the old block, having a first data type (e.g., hot data) to a first block 620 and may write data, from the old block, having a second data type (e.g., cold data) to a second block 630. This may reduce write amplification and wear-out of blocks because copying all of the hot data to a single block, rather than multiple blocks, may reduce a quantity of blocks that need to then be later erased within a short time period of copying the data.

For example, as shown by reference number 640, the memory device 120 may copy hot data from the old block of cache memory 225 to the first block 620. To identify the hot data from the old block, the memory device 120 may identify a first set of pages, included in the old block, that store hot data (e.g., first data associated with a first data type). The memory device 120 may copy the hot data to the first block 620 based on identifying the first set of pages.

Similarly, as shown by reference number 650, the memory device 120 may copy cold data from the old block of cache memory 225 to the second block 630. To identify the cold data from the old block, the memory device 120 may identify a second set of pages, included in the old block, that store cold data (e.g., second data associated with a second data type). The memory device 120 may copy the cold data to the second block 630 based on identifying the second set of pages.

In some implementations, the memory device 120 may store a data type indicator that indicates, for one or more pages of the cache memory 225 (e.g., an unreserved portion of the cache memory 225), whether data stored in those one or more pages is hot data or cold data. For example, the data type indicator may have a first value (e.g., 0) when corresponding data is hot data, and the data type indicator may have a second value (e.g., 1) when corresponding data is cold data. Additionally, or alternatively, the data type indicator may indicate a time at which data was written (e.g., to one or more pages), and the memory device 120 may use that time to determine whether the data is hot data or cold data. For example, the memory device 120 may compare the time (e.g., a stored time) to a current time (e.g., associated with performing the garbage collection operation) to determine whether data stored in a corresponding page is cold data (e.g., with a difference between the stored time and current time that satisfies a threshold) or hot data (e.g., with a difference between the stored time and current time that does not satisfy the threshold). The memory device 120 may use one or more data type indicators to identify the first set of pages that store the hot data and/or the second set of pages that store the cold data.

In some implementations, the first block 620 and the second block 630 are both included in the main memory 230, and both the hot data and the cold data are copied to the main memory 230. This may free up more memory resources of the cache memory 225 than if some of the data (e.g., the hot data) is stored in a new block of the cache memory 225. Alternatively, in some implementations, the first block 620 may be included in the cache memory 225 and the second block 630 may be included in the main memory 230. This may free up some of the cache memory 225 (e.g., by copying cold data to the main memory 230) while reducing write amplification of the main memory 230 (e.g., by keeping the hot data in the cache memory 225).

In some implementations, the memory device 120 may determine whether to copy both the hot data and the cold data to the main memory 230 or to copy the cold data to the main memory 230 and the hot data to the cache memory 225 based on an amount of available unreserved cache memory 225. For example, if the amount of available unreserved cache memory 225 is less than (or equal to) a threshold amount, then the memory device 120 may copy both the hot data and the cold data to the main memory 230 to free up memory resources of the cache memory 225 (e.g., to create more available unreserved cache memory 225). If the amount of available unreserved cache memory 225 is greater than (or equal to) the threshold amount, then the memory device 120 may copy the cold data to the main memory 230 and may copy the hot data to the cache memory 225 to reduce write amplification of the main memory 230 (and because there is less need to free up memory resources of the cache memory 225).

Additionally, or alternatively, the memory device 120 may determine whether to copy both the hot data and the cold data to the main memory 230 or to copy the cold data to the main memory 230 and the hot data to the cache memory 225 based on one or more block age parameters associated with the cache memory 225, such as a number of P/E cycles associated with available blocks of the cache memory 225 (e.g., an unreserved portion of the cache memory 225), and an average number of P/E cycles associated with blocks of the cache memory 225 (e.g., an unreserved portion of the cache memory 225). For example, if a P/E cycle parameter associated with the cache memory 225 is greater than (or equal to) a threshold, then the memory device 120 may copy both the hot data and the cold data to the main memory 230 to reduce wear on the cache memory 225. If the P/E cycle parameter associated with the cache memory 225 is less than (or equal to) the threshold, then the memory device 120 may copy the cold data to the main memory 230 and may copy the hot data to the cache memory 225 to reduce write amplification of the main memory 230 (and because there is less need to reduce wear on the cache memory 225).

In some implementations, the memory device 120 may use one or more block age parameters to select a block of the cache memory 225 and/or a block of the main memory 230 to which to copy hot data. For example, the memory device 120 may copy hot data to a block with a lower P/E cycle count (e.g., less than or equal to a threshold) and/or may refrain from copying hot data to a block with a higher P/E cycle count (e.g., greater than or equal to a threshold). This may result in more even wear on blocks of the cache memory 225 and/or the main memory 230.

In some implementations, the memory device 120 may modify a configuration that indicates a first set of blocks of the cache memory 225 reserved for write-boosted data, a second set of blocks of the cache memory 225 reserved for small fragment data, and/or a third set of blocks of the cache memory 225 that are unreserved. For example, if one of the sets of blocks is wearing out faster than the other set(s) of blocks (e.g., based on a P/E cycle count), then the memory device 120 may modify which blocks are included in each set (e.g., to achieve wear leveling).

As indicated above, FIG. 6 is provided as an example. Other examples may differ from what is described with regard to FIG. 6.

Figure 7:
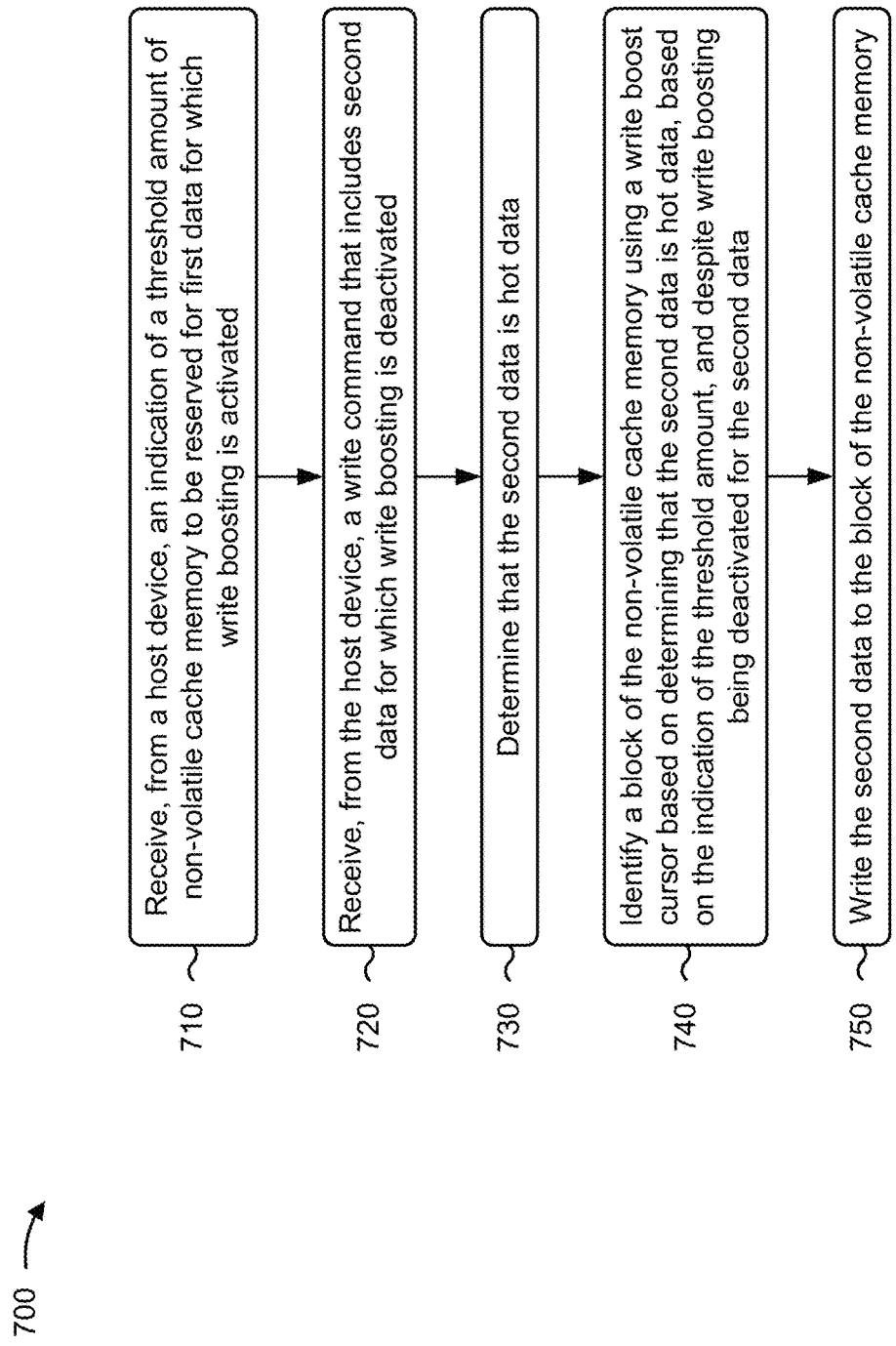
FIGS. 7-9 are flowcharts of example methods associated with opportunistic storage of non-write-boosted data in write booster cache memory.

FIG. 7 is a flowchart of an example method 700 associated with opportunistic storage of non-write-boosted data in write booster cache memory. In some implementations, a memory device (e.g., the memory device 120) may perform or may be configured to perform the method 700. In some implementations, another device or a group of devices separate from or including the memory device (e.g., the system 100) may perform or may be configured to perform the method 700. Additionally, or alternatively, one or more components of the memory device (e.g., the controller 130, the memory management component 235, the memory reservation component 240, the memory selection component 245, and/or the command execution component 250)

may perform or may be configured to perform the method 700. Thus, means for performing the method 700 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 700.

As shown in FIG. 7, the method 700 may include receiving, from a host device, an indication of a threshold amount of non-volatile cache memory to be reserved for first data for which write boosting is activated (block 710). As further shown in FIG. 7, the method 700 may include receiving, from the host device, a write command that includes second data for which write boosting is deactivated (block 720). As further shown in FIG. 7, the method 700 may include determining that the second data is hot data (block 730). As further shown in FIG. 7, the method 700 may include identifying a block of the non-volatile cache memory using a write boost cursor based on determining that the second data is hot data, based on the indication of the threshold amount, and despite write boosting being deactivated for the second data (block 740). As further shown in FIG. 7, the method 700 may include writing the second data to the block of the non-volatile cache memory (block 750).

The method 700 may include additional aspects, such as any single aspect or any combination of aspects described below and/or described in connection with one or more other methods or operations described elsewhere herein.

In a first aspect, the method 700 includes identifying the block using the write boost cursor based on a determination that writing the second data to the non-volatile cache memory will not reduce an available amount of non-volatile cache memory reserved for the first data below the threshold amount.

In a second aspect, alone or in combination with the first aspect, the method 700 includes copying hot data stored in the block to a first new block and copying cold data stored in the block to a second new block during a garbage collection operation performed on the block.

In a third aspect, alone or in combination with one or more of the first and second aspects, the first new block is a first block of non-volatile main memory and the second new block is a second block of the non-volatile main memory.

In a fourth aspect, alone or in combination with one or more of the first through third aspects, the first new block is a new block of the non-volatile cache memory and the second new block is a new block of non-volatile main memory.

In a fifth aspect, alone or in combination with one or more of the first through fourth aspects, the method 700 includes copying the hot data to the first new block and copying the cold data to the second new block during the garbage collection operation based on one or more block age parameters associated with the non-volatile cache memory.

In a sixth aspect, alone or in combination with one or more of the first through fifth aspects, the indication of the threshold amount comprises a threshold size or a threshold percentage.

In a seventh aspect, alone or in combination with one or more of the first through sixth aspects, the method 700 includes storing small fragment data, having a size less than a page line size of a page line of the memory device, in the block of the non-volatile cache memory.

In an eighth aspect, alone or in combination with one or more of the first through seventh aspects, a portion of the non-volatile cache memory is reserved for the small fragment data.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein.

Figure 8:
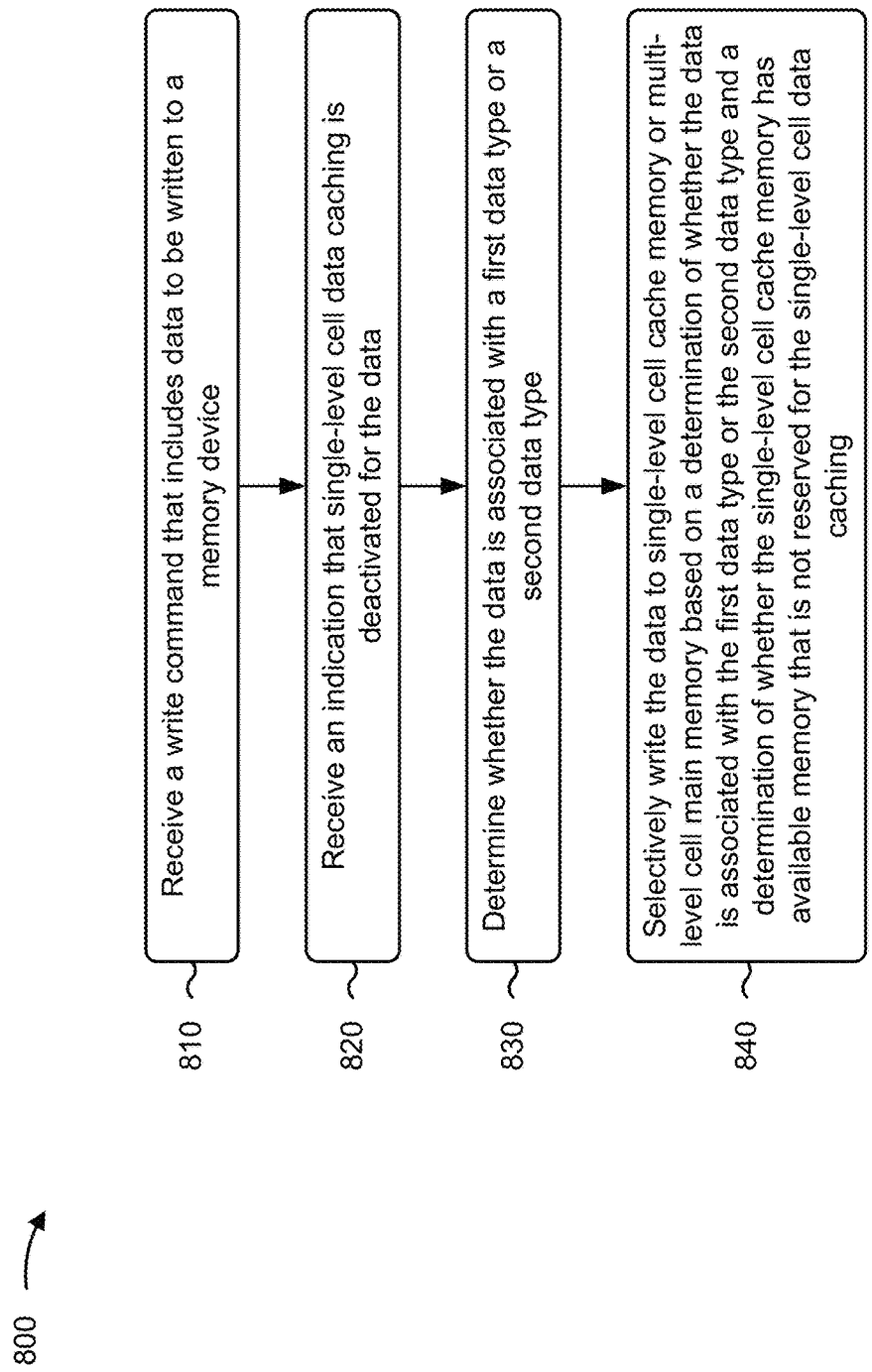

FIG. 8 is a flowchart of an example method 800 associated with opportunistic storage of non-write-boosted data in write booster cache memory. In some implementations, a memory device (e.g., the memory device 120) may perform or may be configured to perform the method 800. In some implementations, another device or a group of devices separate from or including the memory device (e.g., the system 100) may perform or may be configured to perform the method 800. Additionally, or alternatively, one or more components of the memory device (e.g., the controller 130, the memory management component 235, the memory reservation component 240, the memory selection component 245, and/or the command execution component 250) may perform or may be configured to perform the method 800. Thus, means for performing the method 800 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 800.

As shown in FIG. 8, the method 800 may include receiving a write command that includes data to be written to the memory device (block 810). As further shown in FIG. 8, the method 800 may include receiving an indication that single-level cell data caching is deactivated for the data (block 820). As further shown in FIG. 8, the method 800 may include determining whether the data is associated with a first data type or a second data type (block 830). As further shown in FIG. 8, the method 800 may include selectively writing the data to single-level cell cache memory or multi-level cell main memory based on: a determination of whether the data is associated with the first data type or the second data type, and a determination of whether the single-level cell cache memory has available memory that is not reserved for the single-level cell data caching (block 840).

The method 800 may include additional aspects, such as any single aspect or any combination of aspects described below and/or described in connection with one or more other methods or operations described elsewhere herein.

In a first aspect, the first data type is associated with an expected lifespan that is shorter than an expected lifespan associated with the second data type.

In a second aspect, alone or in combination with the first aspect, selectively writing the data to the single-level cell cache memory or the multi-level cell main memory comprises writing the data to the single-level cell cache memory based on a determination that the data is associated with the first data type, and a determination that the single-level cell cache memory has sufficient memory, that is not reserved for the single-level cell data caching, to store the data.

In a third aspect, alone or in combination with one or more of the first and second aspects, selectively writing the data to the single-level cell cache memory or the multi-level cell main memory comprises writing the data to the multi-level cell main memory based on a determination that the data is associated with the second data type.

In a fourth aspect, alone or in combination with one or more of the first through third aspects, selectively writing the data to the single-level cell cache memory or the multi-level cell main memory comprises writing the data to the multi-level cell main memory based on a determination that the single-level cell cache memory does not have sufficient memory, that is not reserved for the single-level cell data caching, to store the data.

In a fifth aspect, alone or in combination with one or more of the first through fourth aspects, the method 800 includes receiving, from a host device, an indication of an amount of memory in the single-level cell cache memory to be reserved for the single-level cell data caching, and the determination of whether the single-level cell cache memory has available memory that is not reserved for the single-level cell data caching is based on the amount of memory in the single-level cell cache memory to be reserved for the single-level cell data caching.

In a sixth aspect, alone or in combination with one or more of the first through fifth aspects, the method 800 includes identifying a block of the single-level cell cache memory for which a garbage collection operation is to be performed, identifying a first set of pages, included in the block, that store first data associated with the first data type, identifying a second set of pages, included in the block, that store second data associated with the second data type, copying the first data to a first block as part of performing the garbage collection operation, and copying the second data to a second block as part of performing the garbage collection operation.

In a seventh aspect, alone or in combination with one or more of the first through sixth aspects, both the first block and the second block are included in the multi-level cell main memory.

In an eighth aspect, alone or in combination with one or more of the first through seventh aspects, the first block is included in the single-level cell cache memory and the second block is included in the multi-level cell main memory.

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein.

Figure 9:
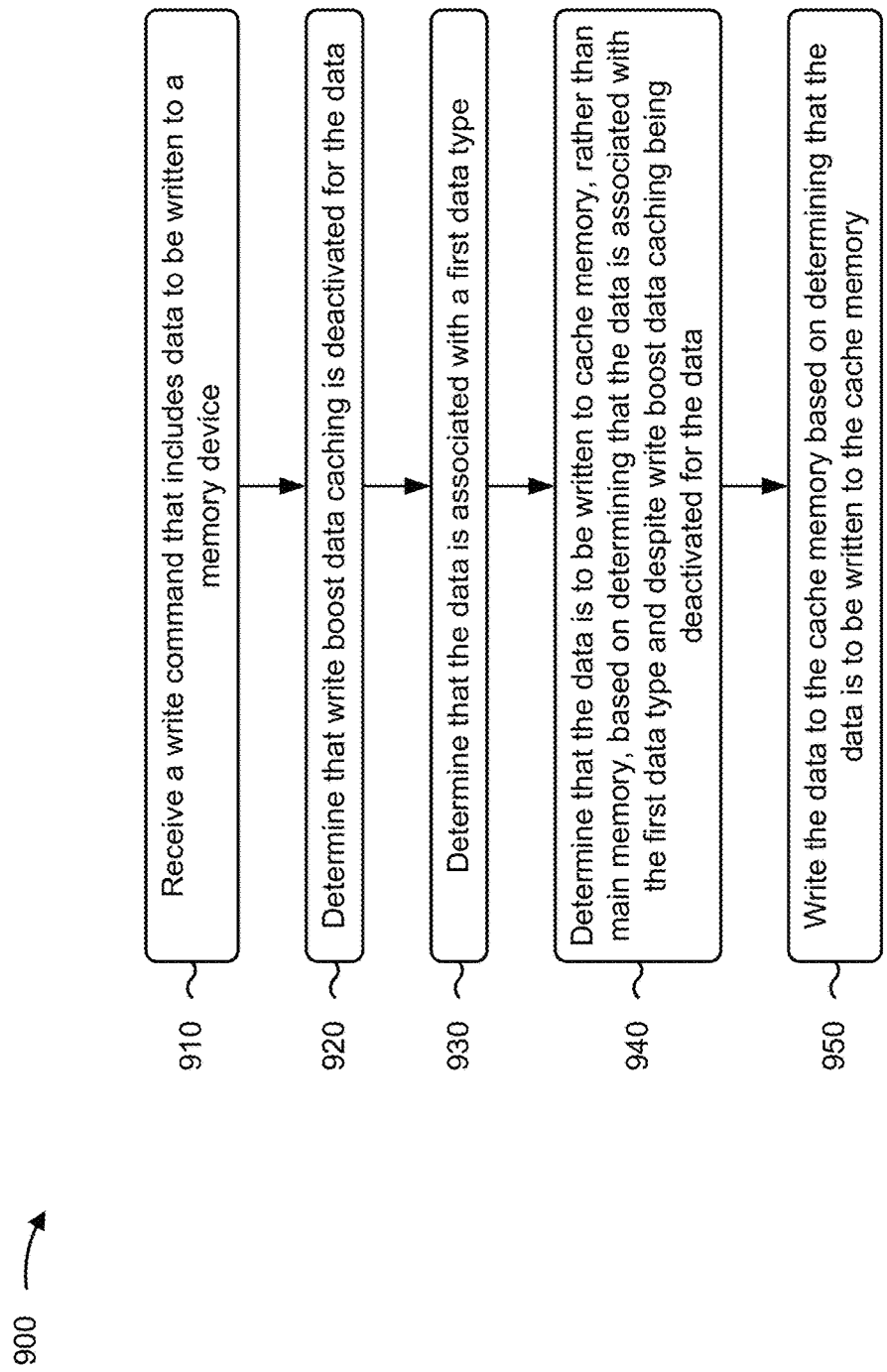

FIG. 9 is a flowchart of an example method 900 associated with opportunistic storage of non-write-boosted data in write booster cache memory. In some implementations, a memory device (e.g., the memory device 120) may perform or may be configured to perform the method 900. In some implementations, another device or a group of devices separate from or including the memory device (e.g., system 100) may perform or may be configured to perform the method 900. Additionally, or alternatively, one or more components of the memory device (e.g., the controller 130, the memory management component 235, the memory reservation component 240, the memory selection component 245, and/or the command execution component 250) may perform or may be configured to perform the method 900. Thus, means for performing the method 900 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 900.

As shown in FIG. 9, the method 900 may include receiving a write command that includes data to be written to the memory device (block 910). As further shown in FIG. 9, the method 900 may include determining that write boost data caching is deactivated for the data (block 920). As further shown in FIG. 9, the method 900 may include determining that the data is associated with a first data type (block 930). As further shown in FIG. 9, the method 900 may include determining that the data is to be written to cache memory, rather than main memory, based on determining that the data is associated with the first data type and despite write boost data caching being deactivated for the data (block 940). As further shown in FIG. 9, the method 900 may include writing the data to the cache memory based on determining that the data is to be written to the cache memory (block 950).

The method 900 may include additional aspects, such as any single aspect or any combination of aspects described below and/or described in connection with one or more other methods or operations described elsewhere herein.

In a first aspect, the first data type is expected to become invalid or is expected to be overwritten in a shorter amount of time than a second data type.

In a second aspect, alone or in combination with the first aspect, the main memory stores more bits per memory cell than the cache memory.

In a third aspect, alone or in combination with one or more of the first and second aspects, determining that the data is to be written to the cache memory further comprises determining that the data is to be written to the cache memory based on a determination that writing the data to the cache memory would leave a remaining amount of available cache memory that satisfies a threshold.

In a fourth aspect, alone or in combination with one or more of the first through third aspects, the method 900 includes receiving an indication of the threshold, wherein the threshold indicates an amount of cache memory to be reserved for the write boost data caching.

In a fifth aspect, alone or in combination with one or more of the first through fourth aspects, the method 900 includes writing small fragment data, having a size less than a page line size of a page line of the memory device, to the cache memory.

In a sixth aspect, alone or in combination with one or more of the first through fifth aspects, the method 900 includes identifying a block of the cache memory for which a garbage collection operation is to be performed, and copying first data, associated with the first data type and stored in the block, to a first block as part of performing the garbage collection operation, and copying second data, associated with a first data type and stored in the block, to a second block as part of performing the garbage collection operation.

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein.

In some implementations, a memory device includes one or more components configured to: receive, from a host device, an indication of a threshold amount of non-volatile cache memory to be reserved for first data for which write boosting is activated; receive, from the host device, a write command that includes second data for which write boosting is deactivated; determine that the second data is hot data; identify a block of the non-volatile cache memory using a write boost cursor based on determining that the second data is hot data, based on the indication of the threshold amount, and despite write boosting being deactivated for the second data; and write the second data to the block of the non-volatile cache memory.

In some implementations, a method includes receiving, by a memory device, a write command that includes data to be written to the memory device; receiving, by the memory device, an indication that single-level cell data caching is deactivated for the data; determining, by the memory device, whether the data is associated with a first data type or a second data type; and selectively writing, by the memory device, the data to single-level cell cache memory or multi-level cell main memory based on: a determination of whether the data is associated with the first data type or the second data type, and a determination of whether the single-level cell cache memory has available memory that is not reserved for the single-level cell data caching.

In some implementations, an apparatus includes a non-volatile memory array; and a controller configured to execute instructions that cause the apparatus to: process a received command to write data to the non-volatile memory array, wherein the command is received without an indication that the data is to be written in a single-level cell (SLC) cache memory of the non-volatile memory array; determine whether the data is associated with a first data type; determine whether the SLC cache memory has sufficient memory not reserved for SLC data caching; and write the data to the SLC cache memory based on a determination that the data is associated with the first data type and that the SLC cache memory has sufficient memory not reserved for SLC data caching.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like. The phrases "based on" or "in response to" may be used in place of "if" as used herein. For example, an operation being performed "if" a condition is satisfied may be replaced with the operation being performed "based on" the condition being satisfied or the operation being performed "in response to" the condition being satisfied.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
    a non-volatile cache memory; and
    one or more controllers configured to:
        receive, from a host device, an indication of a threshold amount of the non-volatile cache memory to be reserved for first data for which write boosting is activated;
        receive, from the host device, a write command that includes second data for which write boosting is deactivated;
        determine that the second data is hot data;
        identify a block of the non-volatile cache memory using a write boost cursor based on determining that the second data is hot data, based on the indication of the threshold amount, and despite write boosting being deactivated for the second data; and
        write the second data to the block of the non-volatile cache memory.

2. The memory device of claim 1, wherein the one or more controllers, to identify the block using the write boost cursor, are configured to:
    identify the block using the write boost cursor based on a determination that writing the second data to the non-volatile cache memory will not reduce an available amount of non-volatile cache memory reserved for the first data below the threshold amount.

3. The memory device of claim 1, wherein the one or more controllers are further configured to copy hot data stored in the block to a first new block and copy cold data stored in the block to a second new block during a garbage collection operation performed on the block.

4. The memory device of claim 3, wherein the first new block is a first block of non-volatile main memory and the second new block is a second block of the non-volatile main memory.

5. The memory device of claim 3, wherein the first new block is a new block of the non-volatile cache memory and the second new block is a new block of non-volatile main memory.

6. The memory device of claim 3, wherein the one or more controllers are configured to copy the hot data to the first new block and copy the cold data to the second new block during the garbage collection operation based on one or more block age parameters associated with the non-volatile cache memory.

7. The memory device of claim 1, wherein the indication of the threshold amount comprises a threshold size or a threshold percentage.

8. The memory device of claim 1, further comprising storing small fragment data, having a size less than a page line size of a page line of the memory device, in the block of the non-volatile cache memory.

9. The memory device of claim 8, wherein a portion of the non-volatile cache memory is reserved for the small fragment data.

10. A method, comprising:
receiving, by a memory device, a write command that includes data to be written to the memory device;
receiving, by the memory device, an indication that single-level cell data caching is deactivated for the data;
determining, by the memory device, whether the data is associated with a first data type or a second data type; and
selectively writing, by the memory device, the data to single-level cell cache memory or multi-level cell main memory based on:
a determination of whether the data is associated with the first data type or the second data type, and
a determination of whether the single-level cell cache memory has available memory that is not reserved for the single-level cell data caching.

11. The method of claim 10, wherein the first data type is associated with an expected lifespan that is shorter than an expected lifespan associated with the second data type.

12. The method of claim 10, wherein selectively writing the data to the single-level cell cache memory or the multi-level cell main memory comprises writing the data to the single-level cell cache memory based on:
a determination that the data is associated with the first data type, and
a determination that the single-level cell cache memory has sufficient memory, that is not reserved for the single-level cell data caching, to store the data.

13. The method of claim 10, wherein selectively writing the data to the single-level cell cache memory or the multi-level cell main memory comprises writing the data to the multi-level cell main memory based on a determination that the data is associated with the second data type.

14. The method of claim 10, wherein selectively writing the data to the single-level cell cache memory or the multi-level cell main memory comprises writing the data to the multi-level cell main memory based on a determination that the single-level cell cache memory does not have sufficient memory, that is not reserved for the single-level cell data caching, to store the data.

15. The method of claim 10, further comprising receiving, from a host device, an indication of an amount of memory in the single-level cell cache memory to be reserved for the single-level cell data caching, and
wherein the determination of whether the single-level cell cache memory has available memory that is not reserved for the single-level cell data caching is based on the amount of memory in the single-level cell cache memory to be reserved for the single-level cell data caching.

16. The method of claim 10, further comprising:
identifying a block of the single-level cell cache memory for which a garbage collection operation is to be performed;
identifying a first set of pages, included in the block, that store first data associated with the first data type;
identifying a second set of pages, included in the block, that store second data associated with the second data type;
copying the first data to a first block as part of performing the garbage collection operation; and
copying the second data to a second block as part of performing the garbage collection operation.

17. The method of claim 16, wherein both the first block and the second block are included in the multi-level cell main memory, or
wherein the first block is included in the single-level cell cache memory and the second block is included in the multi-level cell main memory.

18. An apparatus, comprising:
a non-volatile memory array; and
a controller configured to execute instructions that cause the apparatus to:
process a received command to write data to the non-volatile memory array, wherein the command is received without an indication that the data is to be written in a single-level cell (SLC) cache memory of the non-volatile memory array;
determine whether the data is associated with a first data type;
determine whether the SLC cache memory has sufficient memory not reserved for SLC data caching; and
write the data to the SLC cache memory based on a determination that the data is associated with the first data type and that the SLC cache memory has sufficient memory not reserved for SLC data caching.

19. The apparatus of claim 18, wherein the controller is configured to execute instructions that cause the apparatus to:
write the data to a multi-level cell memory of the non-volatile memory array based on a determination that the data is not associated with the first data type or that the SLC cache memory does not have sufficient memory not reserved for SLC data caching.

20. The apparatus of claim 18, wherein the first data type is expected to become invalid or is expected to be overwritten in a shorter amount of time than a second data type.

* * * * *